(12) United States Patent
Thomasset

(10) Patent No.: US 7,923,085 B2
(45) Date of Patent: Apr. 12, 2011

(54) MULTILAYER DOSE HAVING A CONCAVE SURFACE

(75) Inventor: Jacques Thomasset, Vouvry (CH)

(73) Assignee: Aisapack Holding S.A., Vouvry (CH)

( * ) Notice: Subject to any disclaimer, the term of this patent is extended or adjusted under 35 U.S.C. 154(b) by 68 days.

(21) Appl. No.: 10/591,126

(22) PCT Filed: Feb. 26, 2005

(86) PCT No.: PCT/IB2005/050707
§ 371 (c)(1),
(2), (4) Date: Aug. 30, 2006

(87) PCT Pub. No.: WO2005/084903
PCT Pub. Date: Sep. 15, 2005

(65) Prior Publication Data
US 2007/0178276 A1    Aug. 2, 2007

(30) Foreign Application Priority Data

| Mar. 1, 2004 | (CH) | 0336/04 |
| Oct. 4, 2004 | (CH) | 1619/04 |
| Dec. 8, 2004 | (CH) | 2033/04 |
| Dec. 8, 2004 | (CH) | 2034/04 |

(51) Int. Cl.
  B32B 1/00        (2006.01)
  B32B 1/08        (2006.01)
  B29D 22/00       (2006.01)
  B28B 13/00       (2006.01)
(52) U.S. Cl. .... 428/35.7; 428/36.9; 264/241; 425/131.1
(58) Field of Classification Search ............... 428/35.7, 428/36.6, 36.7, 76, 161; 264/257, 266, 143, 264/148, 172.15, 173.16, 241, 328.8; 425/130, 133.1, 308
See application file for complete search history.

(56) References Cited

U.S. PATENT DOCUMENTS

| 3,901,638 A | 8/1975 | Yoshikawa et al. |
| 3,969,563 A | 7/1976 | Hollis, Sr. |
| 4,154,893 A | 5/1979 | Goldman |
| 4,390,487 A | 6/1983 | O'Mara |
| 4,419,412 A | 12/1983 | Gross |
| 4,876,052 A | 10/1989 | Yamada et al. |
| 4,883,630 A * | 11/1989 | Langecker ................ 264/513 |
| 4,921,647 A | 5/1990 | Stewart |
| 4,940,557 A | 7/1990 | Kimura |

(Continued)

FOREIGN PATENT DOCUMENTS

EP    0 468 261 A2    1/1992

(Continued)

OTHER PUBLICATIONS

Patent Abstracts of Japan vol. 14, No. 305, Jun. 29, 1990 & JP 02 098415, Apr. 10, 1990.

(Continued)

*Primary Examiner* — Rena L Dye
*Assistant Examiner* — Erik Kashnikow
(74) *Attorney, Agent, or Firm* — Nixon & Vanderhye P.C.

(57) ABSTRACT

A dose, having an axis of symmetry, for the realization of multilayer objects by compression molding, comprising a first synthetic resin and at least one fine layer of functional resin imprisoned at least largely in the resin wherein a part of its surface is concave.

14 Claims, 5 Drawing Sheets

U.S. PATENT DOCUMENTS

| | | | |
|---|---|---|---|
| 5,110,519 A | | 5/1992 | Daubenbuchel et al. |
| 5,296,278 A | | 3/1994 | Nishimura et al. |
| 5,403,529 A | * | 4/1995 | Kawaguchi ............ 264/167 |
| 5,975,871 A | | 11/1999 | Kudert et al. |
| 6,332,767 B1 | * | 12/2001 | Kudert et al. ............ 425/130 |
| 6,467,643 B1 | | 10/2002 | Sadr |
| 6,613,408 B1 | | 9/2003 | Short |
| 6,808,673 B2 | * | 10/2004 | Van Schaftingen ............ 264/512 |
| 2002/0182351 A1 | | 12/2002 | Akiyama et al. |

FOREIGN PATENT DOCUMENTS

| | | |
|---|---|---|
| EP | 0 468 261 A3 | 1/1992 |
| FR | 2 299 957 | 9/1976 |
| JP | 51-100163 | 9/1976 |
| JP | 61-259942 | 11/1986 |
| JP | 62-184817 | 8/1987 |
| JP | 2-098415 | 4/1990 |
| JP | 02098415 | 4/1990 |
| JP | 2-134222 | 5/1990 |
| JP | 6-320597 | 11/1994 |
| JP | 11-268782 | 10/1999 |
| JP | 2000-326393 | 11/2000 |
| JP | 2001-163321 | 6/2001 |
| JP | 2003-71910 | 3/2003 |

OTHER PUBLICATIONS

English Translation of International Preliminary Report on Patentability.
Patent Abstracts of Japan vol. 14, No. 305, Jun. 29, 1990 & JP 02 098415, Apr. 10, 1990.
International Search Report.
Office Action mailed Oct. 31, 2008 in U.S. Appl. No. 10/590,201.
Office Action mailed Jun. 8, 2009 in U.S. Appl. No. 10/590,201.
Advisory Action mailed Oct. 28, 2009 in U.S. Appl. No. 10/590,201.
Office Action mailed Jun. 11, 2008 in U.S. Appl. No. 10/591,117.
Office Action mailed Dec. 24, 2008 in U.S. Appl. No. 10/591,117.
Interview Summary mailed May 6, 2009 in U.S. Appl. No. 10/591,117.
Office Action mailed Aug. 18, 2009 in U.S. Appl. No. 10/591,117.
Interview Summary mailed Oct. 28, 2009 in U.S. Appl. No. 10/591,117.
Office Action mailed Jun. 12, 2008 in U.S. Appl. No. 10/591,116.
Notice of Allowance mailed Jan. 28, 2009 in U.S. Appl. No. 10/591,116.
Office Action mailed Jun. 12, 2008 in U.S. Appl. No. 10/591,126.
Office Action mailed Dec. 24, 2008 in U.S. Appl. No. 10/591,126.
Advisory Action mailed Apr. 6, 2009 in U.S. Appl. No. 10/591,126.
Office Action mailed Jul. 2, 2009 in U.S. Appl. No. 10/591,126.
Interview Summary mailed Oct. 28, 2009 in U.S. Appl. No. 10/591,126.
Office Action mailed Jun. 11, 2008 in U.S. Appl. No. 10/591,127.
Office Action mailed Dec. 17, 2008 in U.S. Appl. No. 10/591,127.
Advisory Action mailed Jul. 6, 2009 in U.S. Appl. No. 10/591,127.
Office Action mailed Nov. 24, 2009 in U.S. Appl. No. 10/590,201.
Office Action mailed Feb. 5, 2010 in U.S. Appl. No. 10/591,117.
Office Action mailed Feb. 4, 2010 in U.S. Appl. No. 10/591,126.
Office Action mailed Dec. 3, 2009 in U.S. Appl. No. 10/591,127.
Office Action mailed May 18, 2010 in U.S. Appl. No. 10/590,201.
Notice of Allowance Sep. 23, 2010 in U.S. Appl. No. 10/590,201.
Office Action mailed Oct. 4, 2010 in U.S. Appl. No. 10/591,117.
Advisory Action mailed Aug. 19, 2010 in U.S. Appl. No. 10/591,126.
Office Action mailed Sep. 1, 2010 in U.S. Appl. No. 10/591,127.

* cited by examiner

Figure 1 (Prior art : US 4 876 052)
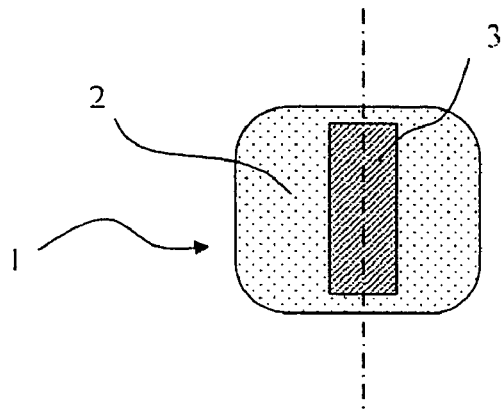
Figure 2 (Prior art : JP 2098415)
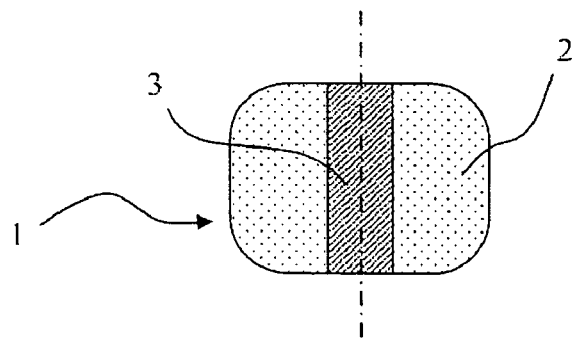
Figure 3 (Prior art : JP 2098415)
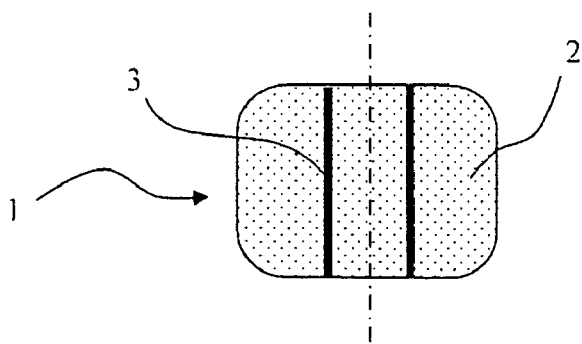

MULTILAYER DOSE HAVING A CONCAVE SURFACE

This application is the US national phase of international application PCT/IB2005/050707 filed 26 Feb. 2005 which designated the U.S. and claims benefit of CH 00336/04; CH 01619/04; CH 02034/04; CH 02033/04, dated 1 Mar. 2004; 4 Oct. 2004; 8 Dec. 2004; 8 Dec. 2004, respectively, the entire content of which is hereby incorporated by reference.

FIELD OF THE INVENTION

The present invention relates to a method for realizing multilayer objects by compression molding of a multilayer dose.

PRIOR ART

Patent U.S. Pat. No. 4,876,052 describes a cylindrical multilayer dose (FIG. 1), characterized in that a functional resin 3 is fully imprisoned inside a synthetic resin 2. The functional resin and the outer resin are different in nature. For example, the functional resin has good gas-barrier properties, whereas the resin forming the outer layer is chosen for its mechanical and hygienic properties. These multilayer doses allow multilayer objects to be obtained by compression molding of said dose. However, the objects obtained according to the method described in patent U.S. Pat. No. 4,876,052 require a large proportion of functional resin in the object, thereby engendering two major drawbacks: the first being a prohibitive cost and the second a lowered resistance to mechanical stresses. The lack of adhesion between the functional resin and the outer resin reduces the solidity of the object and creates a risk of de cohesion of the outer layer. Another drawback of patent U.S. Pat. No. 4,876,052 lies in the fact that the respective quantity of the resins 2 and 3 is only poorly adjustable, these quantities being fixed by the geometry of the object and by the flows during the compression of the dose.

Japanese patent JP 2098415 proposes the realization of a multilayer object by compression molding starting from a cylindrical dose (FIG. 2), characterized in that the synthetic resin 2 covers only the side faces of the functional resin 3. The compression molding of this dose along its axis of symmetry produces an object having a multilayer structure characterized in that the synthetic resin 2 partially imprisons the functional resin 3. However, the multilayer objects realized from two resins according to patent JP 2098415 have two major drawbacks: the first being that of having the functional resin 3 exposed on a central surface area of the object over at least 10% of the total surface area of the object, and the second being that of requiring a quantity of functional resin 3 in the object amounting to at least 30% of the total quantity of resin. This produces, on the one hand, objects having a prohibitive cost and, on the other hand, objects having heavily modified mechanical properties, mainly in the center of the object. Another drawback of JP 2098415 lies in the fact that the respective quantity of the resins 2 and 3 is only slightly adjustable, these quantities being fixed by the geometry of the object and by the flows during the compression of the dose.

In patent JP 2098415, it is proposed to use a cylindrical dose containing 3 layers (FIG. 3) in order partially to eliminate the aforesaid drawbacks. This dose is constituted by a first resin forming the central part of the dose, by a functional resin 3 covering only the side faces of the first resin, and by a third resin 2 covering only the side faces of the functional resin. The crushing of this composite dose along its axis of symmetry produces a multilayer object. The use of a triple-layer dose has the advantage of reducing the quantity of functional resin 3 used and produces objects having slightly modified mechanical properties in relation to the same object containing a single resin 2. This method allows an adhesive layer to be added between the resins of different nature, thereby improving the cohesion and solidity of the object. However, the functional resin 3 does not cover the central part of the multilayer object, which produces objects without barrier property close to the axis of symmetry over a surface area of at least 10% of the surface area of the object. This central region of the object not covered by the barrier resin layer 3 weakens the barrier performance of the object and renders this solution less effective.

SUBJECT OF THE INVENTION

The present invention allows multilayer objects to be realized by compression molding, by eliminating the aforesaid problems. More particularly, this method allows the use of a compression device unchanged from the device used to realize single-layer objects.

SUMMARY OF THE INVENTION

The invention consists of a multilayer dose having an axis of symmetry for the realization of multilayer objects by compression molding, constituted by a first synthetic resin and by at least one fine functional layer imprisoned in said first resin, the multilayer dose being characterized in that a part of its surface is concave. The concave surface can be disposed on the outer surface of the dose or on its inner surface if the latter contains an orifice. The orifice possibly being a passage or a cavity.

The invention is particularly useful for realizing multilayer objects having an orifice, such as tube heads, or without an orifice, such as plugs.

DETAILED DESCRIPTION OF THE INVENTION

A better understanding of the invention will be gained below from a detailed description of the examples illustrated by the following figures.

BRIEF DESCRIPTION OF THE FIGURES

FIGS. 1 to 3 describe the multilayer doses described in the prior art for realizing multilayer objects by compression molding.

FIG. 1 shows a double-layer dose realized according to patent U.S. Pat. No. 4,876,052.

FIG. 2 shows a double-layer dose used in patent JP 2098415.

FIG. 3 illustrates a dose containing 3 layers, described in patent JP 2098415.

DETAILED DESCRIPTION OF THE FIGURES

The invention describes geometries of multilayer doses which are advantageous for realizing multilayer objects. Doses having concave surfaces have been found to be particularly advantageous.

The invention describes multilayer doses having at least a part of their surface concave. According to a first embodiment of the invention, the concave surface of said dose forms an orifice, and according to a second embodiment of the invention, the concave surface of said dose forms a cavity. The invention allows a great diversity of multilayer objects with or without orifice to be realized.

The invention also relates to the methods for realizing said doses.

The invention likewise describes the multilayer objects obtained by the compression molding of said doses.

Figure 4:
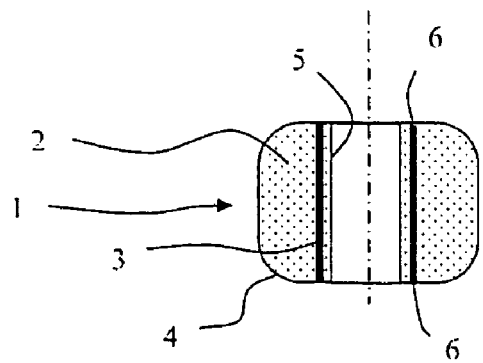
FIG. 4 shows a multilayer dose according to a first embodiment of the invention. This dose comprises a concave surface forming an orifice centered on the axis of symmetry.

FIG. 4 illustrates a first example of a multilayer dose corresponding to the invention. This dose 1 is constituted by a fine layer of functional resin 3 imprisoned in a resin 2. The geometry of the dose 1 is defined by a convex surface 4 describing the circumference of said dose and by a concave surface 5 forming an orifice, said orifice being generally centered on the axis of symmetry of said dose.

A dose according to the first embodiment of the invention is particularly advantageous for realizing multilayer objects having an orifice, the diameter of the orifice of the object being less than or equal to the diameter of the orifice of the dose. In general, it is favorable to use a dose whose orifice is substantially of the same diameter as the orifice of the object to be realized.

A dose according to the first embodiment of the invention (FIG. 4) likewise allows multilayer objects without orifice to be advantageously realized. In patent JP2098415, the use of a cylindrical multilayer dose for forming an object without orifice is described. However, the cylindrical doses such as described in patent JP2098415 do not allow a functional layer to be obtained which is suitably distributed in the central part of the object. In fact, the compression of the cylindrical doses described in patent JP2098415 creates a flow toward the periphery of the object and therefore entrains the functional layer toward the periphery of said object. Hence, it is not possible to entrain the functional layer toward the center of said object. A dose according to the first embodiment of the invention, having a concave surface forming an orifice, allows a flow to be created toward the periphery and toward the center of the object. The functional resin layer 3 is also entrained conjointly toward the periphery and toward the center of the object, whereby a multilayer object having improved barrier properties can be obtained.

Experiments have shown that the radial position of the fine layer of functional resin in the dose was a function of the compression rate, the geometry of the object, the rheology of the resins and the parameters linked to the process. The position of the functional layer in the dose allows the surface of the object, that is to say the periphery and the center, to be optimally covered following compression.

The fine layer of functional resin 3 improves the impermeability of the object to gases or to aromas. In general, it is advantageous to use a small quantity of functional resin for reasons of cost and of usage properties. The quantity of functional resin is usually less than 20% of the volume of the object and this quantity is preferably less than 10%.

The ends of the functional resin layer 3 can lie flush in the surface of said dose, but said functional resin layer 3 is generally totally encapsulated in the resin 2.

Figure 5:
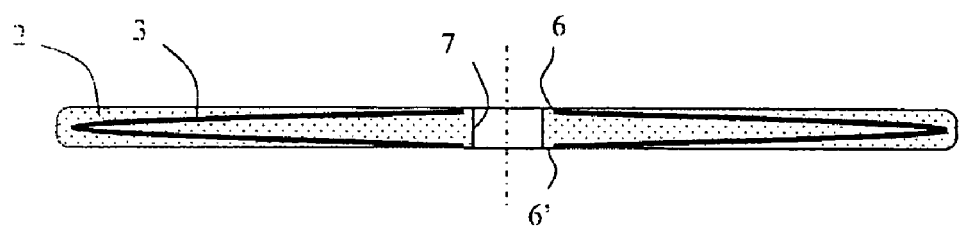
FIG. 5 shows a multilayer object having an orifice and realized from the compression of the dose illustrated in FIG. 4.

FIG. 5 illustrates an object realized from a dose corresponding to the first embodiment of the invention. This object contains an orifice 7. The functional resin layer 3 is imprisoned in the resin 2 and forms a fold close to the periphery of the object. The ends 6 and 6' of the layer 3 are situated proximate to the orifice 7 and are generally absent from the surface of the object, such that the layer 3 is entirely imprisoned in the resin 2. The dose according to the first embodiment of the invention allows the realization of objects comprising an orifice and having a functional layer 3 distributed in at least 90% of said object.

Figure 6:
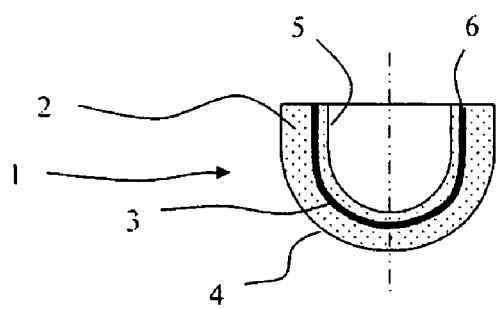
FIG. 6 shows a multilayer dose according to a second embodiment of the invention. This dose comprises a concave surface forming a cavity centered on the axis of symmetry.

FIG. 6 presents a multilayer dose according to the second embodiment of the invention. This dose 1 is constituted by a fine layer of functional resin 3 imprisoned in a resin 2. The geometry of the dose 1 is defined by a convex surface 4 describing the circumference of said dose and by a concave surface 5 forming a cavity, said cavity being generally centered on the axis of symmetry of said dose. As is illustrated in FIG. 6, the functional resin layer 3 has only a single free end 6, which end can lie flush in the surface of the dose or be imprisoned in the resin 2. A dose according to the second embodiment of the invention is particularly advantageous for realizing objects without orifice. FIG. 6 shows the functional layer 3 imprisoned in the resin 2, the resin layers 2 situated on either side of the functional layer 3 generally having a substantially constant thickness. The second embodiment of the invention is not limited to the dose geometry illustrated in FIG. 6. Depending on the device used to realize said multilayer doses, the respective thicknesses of the layers are found to be not necessarily constant, resulting, therefore, in a wide variety of dose. All the doses obtained according to the second embodiment of the invention have a concave surface 5 forming a cavity. The position of the functional layer in the dose is defined so that said layer spreads out to the periphery of the object in the course of the compression. When the functional layer 3 is brought nearer to the convex surface 4 of the dose, the functional layer approaches the periphery of the object.

Figure 7:
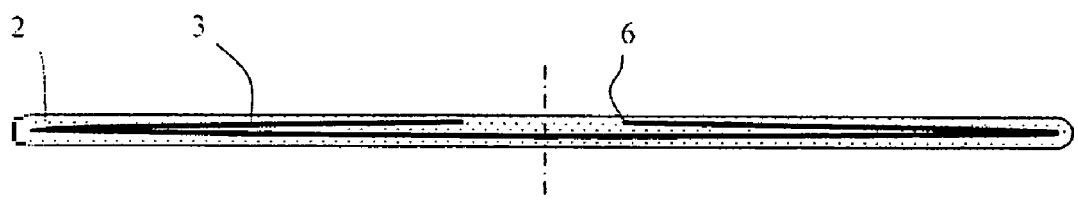
FIG. 7 illustrates a multilayer object without orifice obtained from the compression of the dose illustrated in FIG. 6.

FIG. 7 illustrates a multilayer object obtained by the compression of a dose realized according to the second embodiment of the invention. This multilayer object has improved barrier properties, since the functional layer 3 is present throughout the object, both in the central part and in the periphery. The functional layer 3 forms a fold close to the periphery of said object. The functional layer 3 is preferably totally imprisoned in the resin 2, even at the level of its free end 6.

Figure 8:
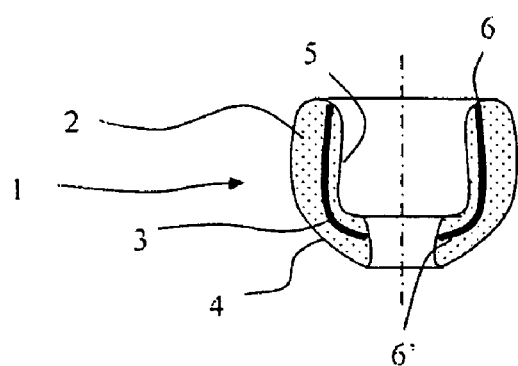
FIG. 8 shows a multilayer dose combining the first and the second embodiment of the invention. The dose comprises a concave surface forming a cavity and an orifice.

FIG. 8 illustrates a dose resulting from the combination of the first and the second embodiment of the invention. This dose 1 is constituted by a fine layer of functional resin 3 imprisoned in a resin 2. The geometry of the dose 1 is defined by a convex surface 4 describing the circumference of said dose and by a concave surface 5 forming a cavity and an orifice, said cavity and said orifice being generally centered on the axis of symmetry of said dose. As is illustrated in FIG. 8, the functional resin layer 3 has two ends 6 and 6', which ends can lie flush in the surface of the dose or be imprisoned in the resin 2. The dose presented in FIG. 8 is particularly advantageous for realizing multilayer objects with or without orifice. The position of the functional layer in the dose is defined so that said layer spreads out to the periphery of the object during the compression. When the functional layer 3 is brought nearer to the convex surface 4 of the dose, the functional layer approaches the periphery of the object. The diameter of orifice and the volume of the cavity are optimized so that the functional layer spreads conjointly toward the center and toward the periphery of said object.

Figure 9:
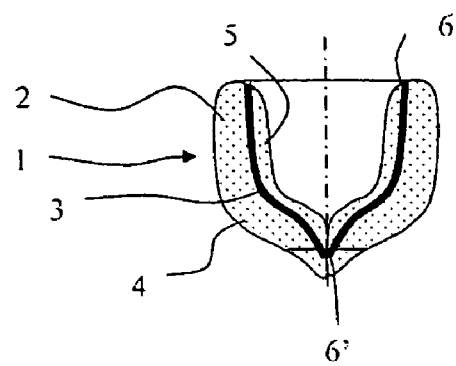
FIG. 9 illustrates a dose having a cavity and corresponding to the second embodiment of the invention.

FIG. 9 illustrates a dose having a cavity and corresponding to the second embodiment of the invention. This dose 1 is constituted by a fine layer of functional resin 3 imprisoned in a resin 2. The geometry of the dose 1 is defined by a convex surface 4 describing the circumference of said dose and by a concave surface 5 forming a cavity, said cavity and said orifice being generally centered on the axis of symmetry of said dose. As is illustrated in FIG. 8, the functional resin layer 3 has two ends 6 and 6', which ends can lie flush in the surface of the dose or be imprisoned in the resin 2. The dose presented in FIG. 8 is particularly advantageous for realizing multilayer objects without orifice. The end 6' of the functional layer 3 forms a possible discontinuity forming a hole in said layer. In order to obtain the best possible barrier properties, it is advantageous to eliminate or reduce this discontinuity.

Figure 10:
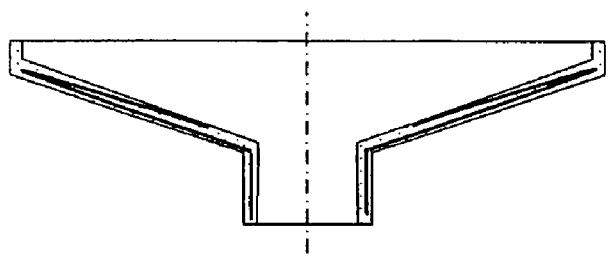
FIG. 10 shows a tube head realized according to the invention.
Figure 11:
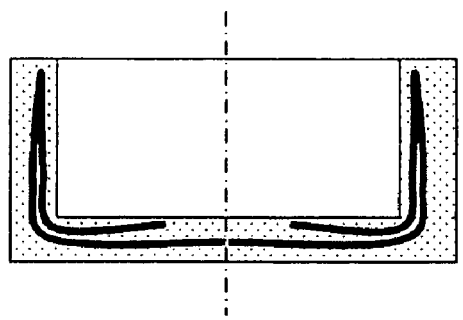
FIG. 11 shows a plug realized according to the invention.

FIG. 10 shows a tube head realized from a multilayer dose having a part of its surface concave and forming an orifice. FIG. 11 shows a plug realized from a multilayer dose having a part of its surface concave and forming a cavity. These objects have the peculiarity of having a fine layer of functional resin covering the whole of the surface of the object and forming a fold at the level of its periphery. These object are obtained by compressing the multilayer dose in a simple compression device which requires no modification in relation to the compression device which would be used to realize the same object from a single-layer dose. More complex compression devices, setting parts of the die tool in motion, can be used to promote the flow of resins in one direction. These devices can be useful for geometries of complex objects and for optimizing the spread of the barrier layer throughout the object.

The objects 10 and 11 have been realized with a fine layer of barrier resin (EVOH) imprisoned in a polyethylene (PE) resin. These objects have great impermeability to oxygen or to aromas.

In order to simplify the account of the invention, the figures have deliberately been represented with only one functional layer 3 imprisoned in a second resin 2. It is known that the combination of only two resins does not generally allow sufficient adhesion to be obtained at the interface between the two resins. It is customary, too, to use adhesive intermediate layers, which allow resins of different nature to be combined, while guaranteeing a good level of adhesion between the layers. Thus, the insertion of an adhesive layer on either side of the barrier layer prevents possible problems of delamination or decohesion in the multilayer objects. The adhesive and barrier layers are parallel and in small quantity. The aggregate of the adhesive layers forming the functional layer 3 generally represents a quantity of resin less than 15% of the total resin volume forming the dose, and preferably a quantity interior to 10%. The present invention is not therefore limited to 3-layer doses such as presented in FIGS. 4, 6, 8 and 9, but more generally contain 5 layers or more.

The resins used within the scope of the invention correspond to the thermoplastic resins currently being used, and more particularly to those used in the packaging industry. Amongst the barrier resins which may be used to form the functional layer 3 can be cited ethylene vinyl alcohol copolymers (EVOH), polyamides such as Nylon-MXD6, acrylonitrile-methylacrylate copolymers (BAREX), fluorinated polymers such as PVDF. In this connection may also be cited a few resins which may be used to form the structure 2 of the object: polyethylene (PE), polypropylene (PP), polystyrene (PS), polyamide (PA), polyester (PET). This list is not exhaustive. In the choice of resins, it is important to select products which have neighboring viscosities. In general, it is preferable to use resins which, at working temperature, have a viscosity ratio less than 10, and preferably a viscosity ratio less than 3 will be chosen.

The compression molding method consists in feeding a multilayer dose of synthetic resins in the molten state into the cavity of a mold, in forming the object by compression molding of said dose in the cavity of said mold, in cooling the object and then removing it from the mold.

The invention allows the realization of objects having a very fine functional layer, which functional layer can represent less than 5% of the volume of the object.

The methods for realizing multilayer objects according to the invention call for multilayer doses to be realized which have a part of their surface concave.

Figure 12:
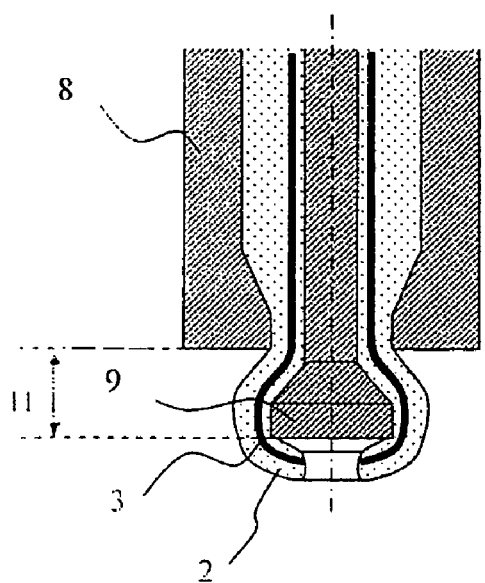
FIGS. 12 to 17 illustrate methods for realizing multilayer doses having a part of their surface concave.
Figure 13:
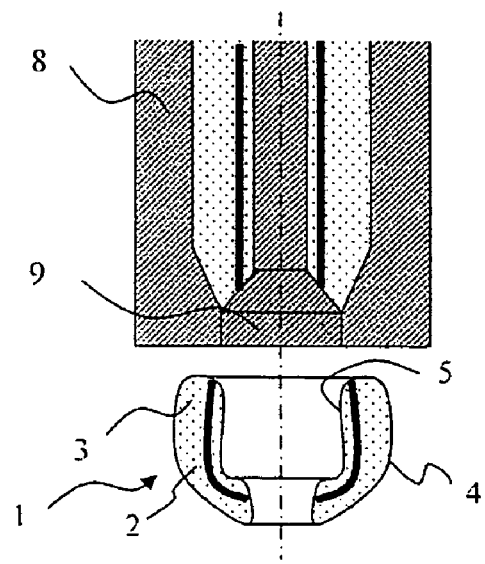

A first method is illustrated in FIGS. 12 and 13. This method consists in making a multilayer tubular coextrusion such as illustrated in FIG. 12. The multilayer flow flows into a die tool comprising at least one die 8 and a mandrel 9. The mandrel 9 is equipped at its end with a shut-off valve, which allows the tube to be periodically cut and the doses to be formed. The multilayer flow is created upstream of the die tool represented in FIG. 12 according to known methods. The trials on which the patent application is based were realized with three extruders connected to a coextrusion head. FIG. 12 shows the position of the mandrel, which extends beyond the die by a height H and allows the creation of the cavity of said dose. Upon exit from the die tool, the flow winds around the mandrel and allows the geometry of the dose to be modified.

It has been found experimentally that the winding of the flow of material around the end of the mandrel 12 is dependent on the height H, on the geometry of the shut-off valve, on the extruded resins, as well as on the motions of the mandrel 9. By optimizing these parameters, it is possible to produce doses with an orifice (FIGS. 4 and 8) or without an orifice (FIG. 6).

FIG. 13 illustrates the closure of the shut-off valve and the cutting of the dose. By modifying the process parameters such as the speed of opening and closing of the shut-off valve, the extrusion rate, the temperatures, or by modifying the geometry of the die tool, it is possible to optimize the concavity of the dose.

Figure 14:
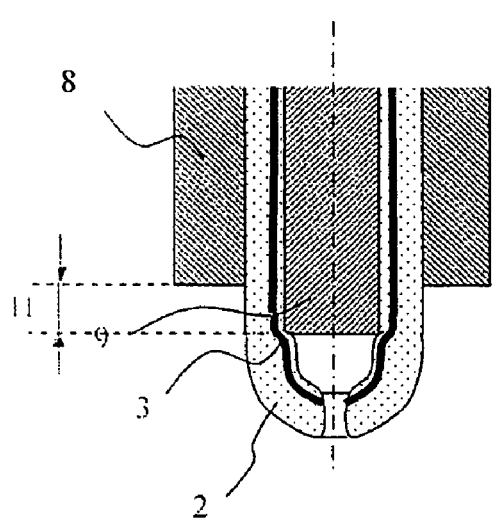
Figure 15:
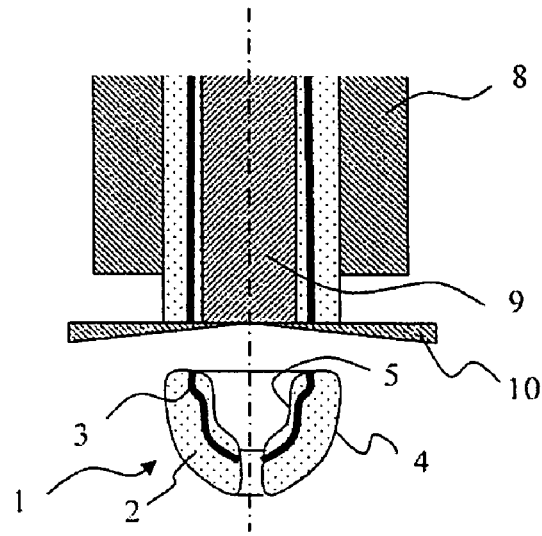

FIGS. 14 and 15 illustrate another process for the realization of concave doses. This process consists in creating a tubular coextrusion in the die tool represented in FIG. 14. This die tool comprises at least one die 8 and a mandrel 9, the mandrel 9 extending beyond the die 8 by a height H. Depending on the geometry of the dose to be realized, the mandrel 9 is fixed, or actuated by a periodical, reciprocating vertical motion in phase with the cutting of the dose. In order to simplify the account of the invention, FIG. 15 represents a mandrel and a die of cylindrical geometry. The invention also covers other die tool geometries which are based on the same principle and allow doses to be produced having a part of their surface concave. The method illustrated in FIGS. 14 and 15 consists in extruding the materials through the die tool 8 and 9 at constant rate, and in periodically cutting the material expelled from the die tool by means of a cutter represented in FIG. 15.

The distance H corresponding to the maximum distance between the ends of the mandrel and of the die generally ranges between 1 mm and 5 cm.

The cutting of the dose can be realized according to other known methods, including, for example, rotary cutters for cutting the rod as it leaves the extruder. This type of cutter can simultaneously be used to transfer the dose into the mold.

The transfer of the dose can be effected by known methods, such as by gravity or by means of a transfer device. The positioning of the dose in the compression mold must be precise and, in particular, the axis of symmetry of the dose must be precisely aligned with the axis of symmetry of the cavity of the mold. The doses are compressed along the axis of symmetry of the dose.

Figure 16:
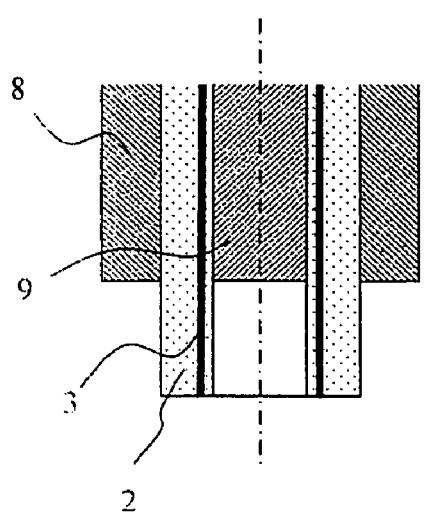
Figure 17:
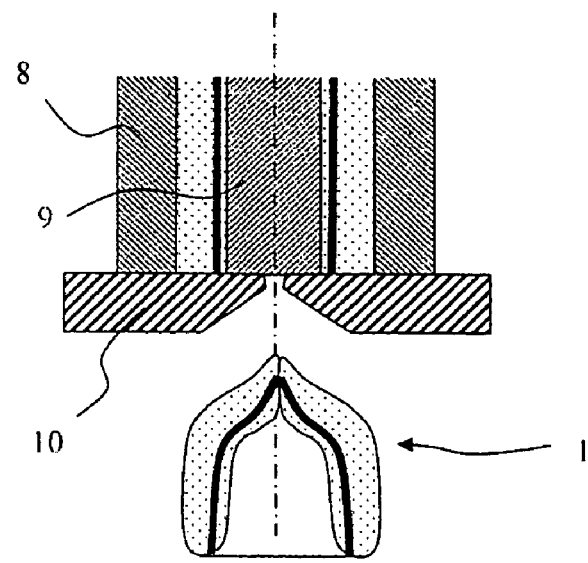

FIG. 17 illustrate another method for realizing doses whereof a part of their surface is concave. This method consists in realizing a tubular dose, then in modifying its concavity in the course of the cutting or in the course of the transfer of said dose into the compression mold. FIG. 16 shows the tubular multilayer extrusion through the die 8 and the mandrel 9. This extrusion is carried out preferably at constant rate. FIG. 17 illustrates the cutting of the multilayer extrudate with a cutter 10. The motion of the cutter 10 has the effect of periodically cutting the extrudate and of conjointly closing the end of said dose 1. Similar methods could be envisaged for cutting and closing the end of the dose simultaneously or sequentially.

The multilayer doses are extruded in the molten state at temperatures suited to the resins used. The multilayer doses remain in the molten state during the step of being transferred into the compression mold. The doses are compression molded and the object obtained is at least partially cooled in the mold prior to ejection.

In the examples which are presented here, the doses and the objects are of simple geometry, but the invention obviously relates to any geometry of dose and of object.

The objects obtained according to the invention contain a functional layer 3 forming at least one fold at the level of the periphery of the object. Objects also containing a second fold close to the axis of symmetry of the object can be obtained. A zigzag arrangement of the functional layer is obtainable in the object.

Numerous arrangements of the functional layer 3 in the dose are possible. It may be advantageous to dispose the functional layer 3 in the dose such that said functional layer 3 forms the shell of a body of revolution centered on the axis of symmetry. When the distance of the functional layer 3 to the axis of symmetry is variable, advantageous multilayer objects can be obtained.

The invention has been described with a single functional layer 3 distributed in the dose. Doses comprising a plurality of functional layers 3 may equally be used, said functional layers all being centered on the axis of symmetry of said dose. The multilayer objects obtained are characterized in that the functional layers are placed at least partially one on top of the other and are distributed throughout the object.

The realization of packagings or packaging components for food applications calls for good hygiene properties. It is thus often desirable for the functional layer 3 not to be in direct contact with the packaged product. It may be advantageous to imprison the functional layer 3 totally in the dose, such that said functional layer is totally imprisoned in the object, or such that said functional layer is absent from that part of said object which calls for high hygiene properties.

Alternatively, it is possible for just one end of the barrier layer not to be imprisoned.

The invention claimed is:

1. A dose comprising:
    a multilayer dose for compression molding, said multilayer dose having a surface, the multilayer dose comprising
        a first synthetic resin, and
        at least one layer of a different functional resin imprisoned at least largely in said first synthetic resin,
    wherein, prior to any compression molding, a part of the multilayer dose's surface is concave, and
    wherein the multilayer dose is in the melt state and has an axis of symmetry for the realization of multilayer objects by compression molding.

2. The dose as claimed in claim 1, comprising an orifice, said concave surface being constituted by a part at least of the inner surface formed by the orifice.

3. The dose as claimed in claim 2 in which the orifice forms a passage through the dose.

4. The dose as claimed in claim 3, in which the orifice forms a cavity which is open on one face of the dose.

5. The dose as claimed in claim 1, wherein the functional layer itself forms a multilayer structure comprising a layer of barrier resin imprisoned between two layers of adhesive resin.

6. A multilayer object obtained from a multilayer dose in the melt state as claimed in claim 1, wherein it contains at least one portion in which the functional layer forms a fold.

7. The multilayer object as claimed in claim 6, having an axis of symmetry, wherein the functional layer forms a body of revolution centered about the axis of symmetry.

8. The multilayer object as claimed in claim 7, wherein said body of revolution is open.

9. The multilayer object as claimed in claim 8, wherein said body of revolution contains an opening centered on the axis of symmetry.

10. The multilayer object as claimed in claim 6, wherein it contains an orifice forming a passage through the object.

11. The multilayer object as claimed in claim 6, wherein it contains no orifice.

12. The multilayer object as claimed in claim 7, wherein said body of revolution is closed.

13. A production process for a multilayer dose in the melt state as claimed in claim 1, wherein the resins constituting the dose are extruded simultaneously and coaxially, initially in a rectilinear direction, and in that the direction of extrusion is then modified in such a way as to form said concave surface of the multilayer dose in the melt state, prior to any compression molding.

14. A device for producing a multilayer dose in the melt state as claimed in claim 1 and using a production process for a multilayer dose in the melt state as claimed in claim 1, wherein resins constituting the dose are extruded simultaneously and coaxially, initially in a rectilinear direction, and in that the direction of extrusion is then modified in such a way as to form said concave surface wherein the device comprises a passage for the linear, simultaneous and coaxial flow of the resins constituting the dose and means for modifying the direction of extrusion in such a way as to form said concave surface, said means being mounted so as to slide inside the passage.

* * * * *